United States Patent [19]
Grube

[11] Patent Number: 6,112,132
[45] Date of Patent: Aug. 29, 2000

[54] AUTOMATED TUBE CUTTING APPARATUS AND METHOD

[75] Inventor: Stephen L. Grube, Aptos, Calif.

[73] Assignee: Ultra Clean Technology Systems & Service, Inc.

[21] Appl. No.: 09/036,580

[22] Filed: Mar. 6, 1998

[51] Int. Cl.[7] .................................................. G06F 19/00
[52] U.S. Cl. ........................ 700/167; 700/164; 700/117; 700/166; 83/73; 83/361; 83/370
[58] Field of Search ................................... 700/164, 167, 700/95, 117, 145, 160, 166; 83/23, 72–74, 360, 361, 364, 365, 370

[56] References Cited

U.S. PATENT DOCUMENTS

| | | | |
|---|---|---|---|
| 3,301,776 | 1/1967 | Hughes | 204/224 |
| 3,365,381 | 1/1968 | Fromson | 204/143 |
| 3,673,072 | 6/1972 | Fleury et al. | 204/224 |
| 4,108,357 | 8/1978 | Inoue | 235/119 |
| 4,408,291 | 10/1983 | Gunzberg et al. | 364/900 |
| 4,585,600 | 4/1986 | Rollyson et al. | 264/3.3 |
| 4,639,874 | 1/1987 | Pezaris | 364/478 |
| 4,819,176 | 4/1989 | Ahmed et al. | 364/468 |
| 4,878,176 | 10/1989 | Teranishi et al. | 364/468 |
| 4,934,225 | 6/1990 | Languillat et al. | 82/53.1 |
| 5,406,870 | 4/1995 | Suitts et al. | 83/23 |
| 5,454,881 | 10/1995 | Fischer | 148/241 |
| 5,777,879 | 7/1998 | Sommerfeldt | 364/469.04 |
| 5,872,715 | 2/1999 | Bechtle | 364/474.09 |

*Primary Examiner*—Paul P. Gordon
*Attorney, Agent, or Firm*—LeeAnn Gorthey

[57] ABSTRACT

A data-driven electrochemical grinding apparatus and method produces series of finished-cut, burr-free tube sections of precisely defined lengths. The data-driven process automatically inputs desired tube lengths, tracks the cut tube sections during the process, and produces recorded output of tube and process parameters. Such tube sections are particularly suitable for use in ultrahigh purity gas cabinets used in semiconductor manufacturing equipment.

14 Claims, 2 Drawing Sheets

AUTOMATED TUBE CUTTING APPARATUS AND METHOD

FIELD OF THE INVENTION

The present invention relates to an apparatus and method for producing a series of finished-cut, deburred tube sections, such as used in construction of ultrahigh purity gas manifolds for semiconductor manufacture.

REFERENCES

DeBarr, A. E. and Oliver, D. A., "Electrochemical Machining", Elsevier Scientific Publishing Co., Inc., New York, 1968.

Hoare, J. P. and Laboda, M. A., "Electrolytic Machining Methods", in *Kirk-Othmer Encyclopedia of Chemical Science and Technology*, 3rd Ed., Vol. 8, pp. 751–763; John Wiley & Sons Inc., 1995.

McGeough, J. A., "Principles of Electrochemical Machining", Chapman and Hall Ltd., London, 1974.

BACKGROUND OF THE INVENTION

Preparation of defined-length tubing sections, e.g. for welding, is a common operation in various industrial applications. One such application, the manufacture of ultrahigh purity gas cabinets for the semiconductor industry, requires tubing that is of precise predetermined length and which has smooth, square-cut, and burr-free ends for clean, precise and reproducible welding. Even small irregularities in the abutting ends of tubing to be welded can lead to potential contamination sites.

Currently, the preparation of such tubing typically employs multiple discrete operations, which may include a first gross cutting, one or more secondary cutting steps to the precise required length, a deburring step, and in some cases a marking step. Such operations are often carried out manually on a tube-by-tube basis, and do not generally produce uniformly square, smooth, and burr-free ends for welding.

It is thus desirable to provide a cutting apparatus and process which produces tube lengths which are precisely and uniformly cut, and substantially burr-free, in a single operation. A preferred apparatus and process also provides for accurate marking of the cut tubes, and allows automated input and recording of tube parameters, such as batch or lot number, serial number and actual cut length of each tube.

SUMMARY OF THE INVENTION

The present invention includes, in one aspect, an apparatus for producing a plurality of finished-cut, burr-free tubing sections. The apparatus includes an electrochemical abrasive cutter, a feeder for feeding tubing to the cutter, and programmable control means for controlling the feeder and other machine functions. Input means are provided for inputting a series of desired cut lengths to the control means. The feeder is thus effective to accurately position one or more lengths of tubing within the cutter for each desired cut length, to produce a corresponding series of cut tubes.

The apparatus also includes means, such as an output tray, for holding the series of cut tubes in serial order for movement to a rinsing tank and thereby to a measuring station. The measuring station includes measuring means effective to determine the actual cut length of each tube. Further holding means, such as a marking tray, are provided for holding the series of cut tubes in serial order for movement through a laser marking station.

In one embodiment, the desired cut length data is downloaded to the control means from a PC cell controller, where the data is stored in downloadable form in an electronic spreadsheet, also referred to herein as a cutsheet. In a preferred embodiment, the cell controller is also operably connected to the measuring station, and is able to track and record, e.g. within the same spreadsheet, the serial position of each cut tube in the series, its desired cut length, and its actual cut length.

The laser marking station includes a laser and a marking chamber having a plurality of marking positions, and preferably includes a corresponding plurality of sensor switches effective to determine which positions within the chamber are occupied with tubes. In a preferred embodiment, the cell controller is operably connected to the laser and to the sensor switches, typically via said programmable control means. The laser is thereby effective to mark each cut tube occupying a marking position with, for example, its correct serial position and actual cut length.

The apparatus further includes at least one bath, and preferably a series of ultrasonic water baths, for removing electrolyte from a batch of cut tubes. Means for determining the electrolyte concentration of a bath, such as a sodium analyzer, are also provided. The cell controller is preferably connected to the electrolyte determining means, and is effective to record the electrolyte concentration of the final bath for each batch of cut tubes.

The apparatus of the invention is effective to produce a series of cut tubes wherein each tube has an actual cut length within 0.0015" of its corresponding desired cut length at ± one standard deviation; that is, the standard deviation of desired cut length from actual cut length for a series of tubes is within about 0.0015".

In another aspect, the invention provides a process for producing a plurality of finished-cut, burr-free tube sections. According to the process, a series of desired cut lengths is input to programmable control means, which are operably connected to a feeder within an electro-chemical abrasive cutter. The control means controls the feeder, in accordance with this input, in accurately positioning the tubing within the cutter for each desired cut length, to produce a corresponding series of cut tubes. The series of tubes is held in serial order for movement to a measuring station, where the actual cut length of each cut tube is determined, and for subsequent movement through a laser marking station.

In a preferred process, the desired cut length data is downloaded to the control means from a PC cell controller, where the data is stored in downloadable form in an electronic spreadsheet, referred to herein as a cutsheet. The measuring station is also connected to the cell controller, which tracks and records the serial position, desired cut length and actual cut length for each cut tube.

Preferably, the cell controller is also operably connected, typically via the PLC, to a laser and a series of sensor switches within the laser marking station. Each such switch corresponds to one of a plurality of marking positions within a marking chamber. From the switches, it is determined which of the marking positions are occupied with cut tubes. The cell controller then inputs to the laser the correct serial position and actual cut length corresponding to each tube within an occupied position, and each tube is marked by the laser with this or additional data as desired.

Finally, the cut tubes are passed in sequential batches through at least one ultrasonic water bath, and the electrolyte concentration of the final bath is determined by, for example, a sodium analyzer, and recorded by the cell controller.

The process of the invention, in a preferred embodiment, is able to produce a series of cut tubes wherein each tube has an actual cut length within 0.0015" of its corresponding desired cut length, at ± one standard deviation.

These and other objects and features of the invention will become more fully apparent when the following detailed description of the invention is read in conjunction with the accompanying drawings.

DETAILED DESCRIPTION OF THE INVENTION

I. Tube Cutting Apparatus

Figure 1:
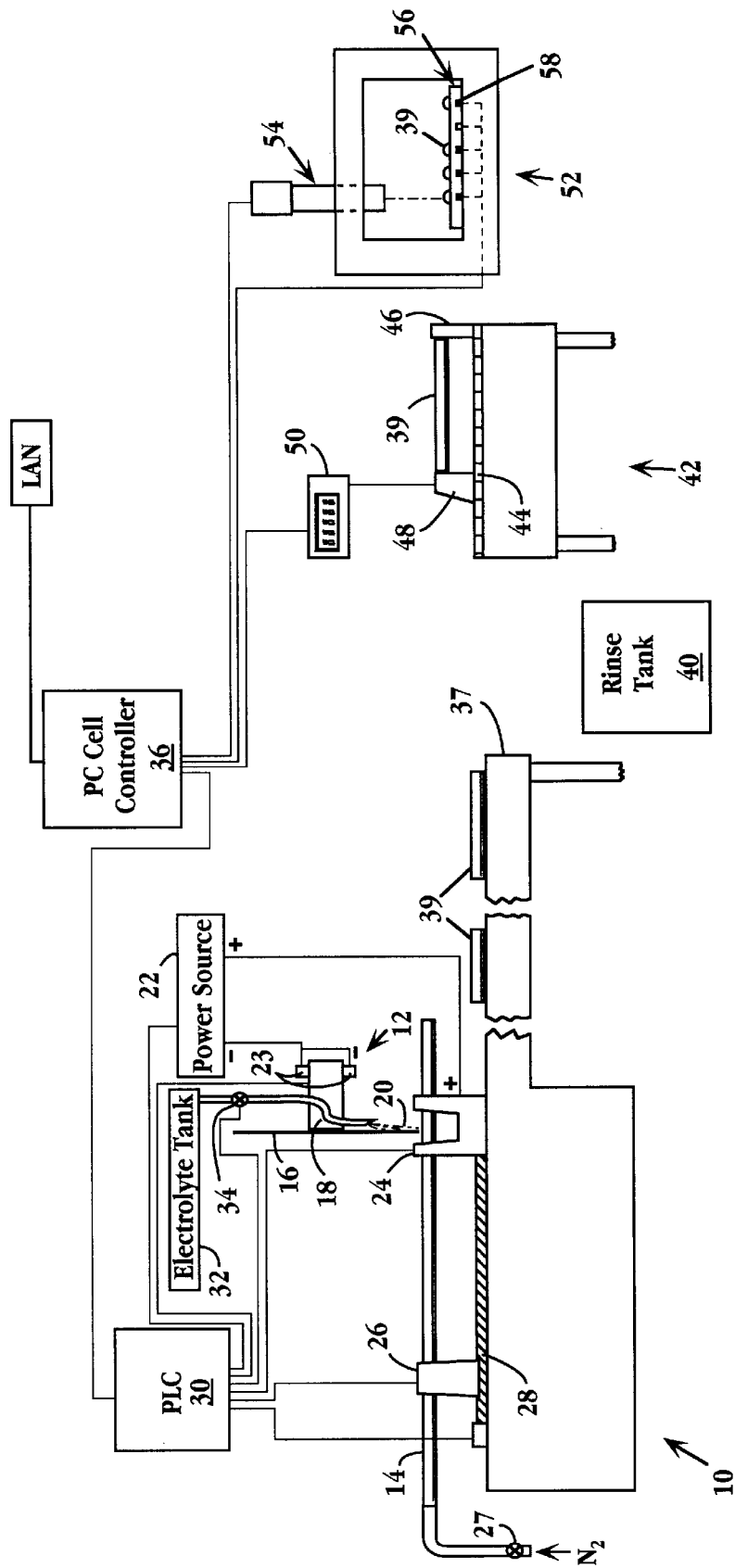
FIG. 1 shows a tube cutting apparatus in accordance with one embodiment of the invention.

The data-driven tube cutting apparatus of the invention, of which one embodiment is shown at 10 in FIG. 1, includes an electrochemical abrasive cutsaw, or grinder, as indicated at 12. Electrochemical grinding (ECG) typically produces less heat damage, residual stresses, and burrs in the finished product than more conventional methods of machining. In this process, the workpiece, in this case a length of metal tubing, as shown at 14, and a cutting or grinding surface 16, typically a wheel, act as anode and cathode, respectively. The wheel is rotated on a spindle 18. The adjacent surfaces of the cutting wheel and tubing define a gap into which electrolyte solution 20 is projected to establish a current. As current flows from the workpiece to the wheel, the surface metal of the workpiece is oxidized to a more easily abraded metal oxide layer. As the oxide layer is removed by the abrasive surface of the wheel, fresh metal is exposed and oxidized. The flow of electrolyte also serves to carry abraded particles away from the work surface.

The grinding wheel is formed of an electrically conductive abrasive material. A typical material is resin-bonded aluminum oxide, where the resin is loaded with a conductive metal such as copper to provide conductivity. The abrasive substance may also be, e.g., diamond or borazon (cubic crystalline boron nitride).

The wheel and tubing are in electric contact with an electrical power source 22, which is preferably a low-voltage, high current (e.g. 300 amp) source. In a typical design, the wheel receives current via current pick-up brushes 23, which are in contact with a rotating, conductive spindle 18, having electrically isolated bearings. The workpiece, or tubing, receives current via a conductive work table or work clamp 24.

For production of tubing sections suitable for TIG (tungsten inert gas) welding and for use in ultrahigh purity gas cabinets used in semiconductor manufacture, the raw tubing is typically 316L stainless steel tubing.

Diameters of 0.250" to 0.500" are common, though the apparatus is readily adaptable to other diameters. Various lengths of raw tubing may be accommodated, with approximately 10' being a typical length.

The apparatus includes a feed clamp 26 for holding lengths of tubing, which are fed to the cutsaw at a predetermined, controlled rate by feeder 28. Both the feed clamp and work clamp 24 are preferably designed to hold several tubes in parallel for simultaneous cutting. The feeder may be a screw feeder as indicated in the figure, a stepper motor, or the like. The feeder is controlled by a programmable logic controller (PLC) 30, also referred to herein as control means. The PLC is typically programmed via EPROM (erasable programmable read only memory). Under the control of the PLC, the feeder is effective to precisely position tubing 14 within the cutter for each desired cut length. The feeder is preferably provided with precision electronic linear scale feedback for optimal accuracy in placement.

The PLC also controls operation of other cutsaw components such as work clamp 24, feed clamp 26, power supply 22, nitrogen purging of tubing via valve 27, and the flow of electrolyte from tank 32 via one or more valves such as shown at 34.

Desired cut lengths may be input to the PLC via different sources, jointly referred to herein as input means. The cut length data may be input manually, via a standard operator interface, or, preferably, they are downloaded from PC cell controller 36, where they are stored in the form of an electronic spreadsheet. As described further below, the controller is also effective to record additional data regarding cut tubing in such a spreadsheet, which is referred to herein as a "cutsheet".

The cell controller may also be operably connected to a local LAN or other network, from which input parameters may be downloaded.

An output tray 38, or other structure suitable for collecting cut tubes 39 in serial order, also referred to herein as holding means, is provided adjacent the cutter. A D.I. water rinse tank, as shown at 40, is preferably provided for rinsing the tubes before their transfer, again in serial order, to adjacent measuring station 42.

The measuring station is capable of measuring cut tubes to the nearest 0.0001". A preferred measuring device, also referred to herein as measuring means, includes a linear scale 44 along which the tube is placed, with one end abutting a fixed structure 46. A linear travel bar 48 is moved along the scale until it abuts the other end of the tube, and the displacement determines the actual cut length of the tube, which is displayed on readout 50. Other measuring means include a caliper, micrometer, steel scale, and the like. The measuring station is operably connected to cell controller 36, such that the actual cut length of each tube may be automatically input to the cell controller and recorded, e.g., in a cutsheet as described above, which includes the serial position and desired cut length of each tube.

The tolerance for the cutting operation is preferably on the order of ±0.0015" (1.5 mils). The apparatus as described herein is thus able to produce a series of cut tubes wherein each tube has an actual cut length within 0.0015", at ± one standard deviation, of its corresponding desired cut length. In other words, the standard deviation of desired cut length from actual cut length for a series of tubes is within about 0.0015". Several months of operation gave results consistently within this standard; in a typical series of tubes, at least two thirds were within 0.0015" of their desired cut length.

Also provided is a laser marking station 52, which includes a laser 54, effective to apply a predetermined mark to each tube in accordance with its serial position. Holding means such as tray 56 are provided to hold tubes in order within a marking chamber. In a preferred embodiment, the marking chamber is equipped with sensor switches 58 corresponding to marking positions within the chamber. These switches are shown adjacent the tray at 58 in FIG. 2, a top view of tray 56, and may also be attached to the tray, as long as it is properly positioned within the marking chamber. The switches determine which marking positions within the chamber, corresponding to slots on the tray, are occupied with tubes. The laser and sensor switches are operably connected to cell controller 36, preferably via the PLC, such that the cell controller is effective to download data corresponding to each tube to the correct marking position. A cleaning station (not shown) containing at least one ultrasonic bath, and preferably several such baths, is also provided. The final bath of the cleaning station is provided with a sodium analyzer to measure electrolyte concentration of the rinse water as each batch of tubes is rinsed. The sodium analyzer is connected to the cell controller, preferably via the PLC, for recording of electrolyte concentration. Finally, a nitrogen-purged oven (not shown) is provided for drying tubes.

II. Tube Cutting Operation

A. Mechanical Components

The invention also provides a data-driven process for producing a series of finished-cut, burr-free tube sections. In accordance with the process, and with further reference to FIG. 1, one or more lengths of tubing are positioned for loading into feed clamp 26. As noted above, several tubes may be loaded in parallel. Prior to loading of tubes, the feed clamp 26 and work clamp 24 are adjusted in accordance with the diameter of tubing being cut. The desired cut depth, rapid approach position and cutting speed of cutting wheel 16 are also set.

Tubing is fed by feed clamp 26 into work clamp 24, either manually or in an automated mode. The diameter and length of the uncut tubing, and cutsheet data, that is, a series of desired cut lengths, are input to the PLC, which controls feeder 28. The cutsheet data may be entered manually at a local interface, or, preferably, they are downloaded from cell controller 36, where they are stored in the form of an electronic spreadsheet or cutsheet, to the PLC.

Generally, an initial crop cut is made to an uncut length of tubing to produce a square, burr-free finish, and tubing is then fed as required to produce the desired lengths. The section of tubing to be cut is held in work clamp 24 during the cutting operation. Operation of the cutsaw is generally in accordance with established procedures for electrochemical grinding (see, for example, reference works such as DeBarr et al., Hoare et al., or McGeough). In particular, however, to produce tubing with highly square cut faces suitable for precise, reproducible welding, the cutting wheel must be maintained orthogonal to the longitudinal axis of the tubing. In addition, while the cutting head is operating, the tubing is purged with nitrogen to prevent electrolyte solution from entering the interior of the tube. This purging assists in the formation of smooth, burr-free cut ends. The nitrogen flow is regulated via valve 27, which is also controlled by the PLC.

The tubing is fed by feeder 28, under the control of programmable logic controller (PLC) 30, in accordance with the cutsheet data. As described above, the feeder accurately positions tubing 24 within the cutter for each desired cut length.

During a cutting operation, the PLC is able to interrupt the cell controller, thus stopping or pausing the operation, when a tube change is necessary, if there is a failure in the cutting apparatus, or if the cutter is stopped by an operator. The operation may then be restarted at the same point in the cutting process.

An output tray 38, or other structure suitable for collecting and conveniently transferring tubes, collects cut tubes and maintains them in serial order. Each tube is then passed through a D.I. water rinse tank, as shown at 40, and transferred, with tubes maintained in serial order, to measuring station 42.

At the measuring station, tubes are measured to determine their actual cut length, preferably to the nearest 0.0001". A preferred measuring device includes a linear scale 44 along which the tube is placed, with one end abutting a fixed structure 46. A linear travel bar 48 is moved along the scale until it abuts the other end of the tube, and the displacement, which determines the actual cut length of the tube, is displayed on readout 50 and recorded. In accordance with one aspect of the invention, the measuring station is operably connected to cell controller 36, preferably via the PLC, and the actual cut length of each tube is input to the cell controller and recorded, e.g. in a cutsheet as described above.

After measuring, each tube exits the measuring station and is transferred to laser marking station 52, with tubes maintained in serial order. Tubes are loaded in order into a tray or similar holder, shown at 56, which has a series of slots corresponding to marking positions within the chamber. The laser 54 marks each tube in accordance with its serial position. Each tube is marked with, for example, its serial position, its actual cut length, and other data from the cutsheet, such as material type or lot number, as desired. During the laser etching process, the chamber is preferably continually purged, e.g. with an inert gas such as nitrogen, to prevent contamination of the tube surfaces.

Figure 2:
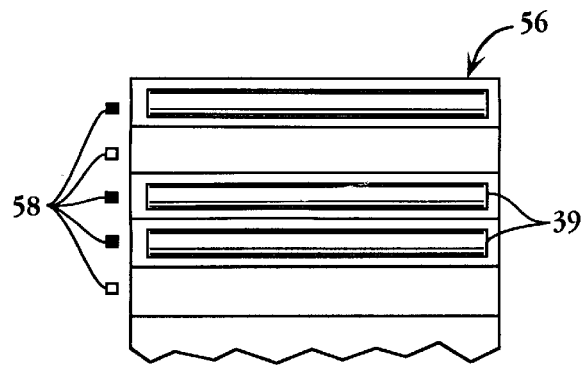
FIG. 2 shows a detail top view of a tray structure for holding cut tubes in a laser marking chamber of the apparatus.

In a preferred embodiment, the marking chamber, or, alternatively, the tray, is equipped with sensor switches, as shown at 58 in FIG. 2. The switches determine which positions of tray 56, and corresponding marking positions within the chamber, are occupied with tubes. The laser and sensor switches are operably connected to cell controller 36. The cell controller is thus effective to download data corresponding to each tube, such as the serial position and actual cut length, to the laser, such that each tube within the tray is correctly marked. Because the sensor switches determine which positions are occupied, the tray need not be fully occupied to ensure correct marking.

Marked tubes are then processed in sequential batches through a cleaning station containing at least one, and preferably several, ultrasonic baths, to remove residual electrolyte from the tubes. The baths are maintained at a temperature of about 45° C. and sonicated at a frequency of about 40–70 KHz, with higher frequencies used for the later baths. A sodium analyzer measures electrolyte concentration of the final bath as each batch of tubes is rinsed. Rinsing continues until the sodium concentration of the final bath is at or below a desired tolerance level, e.g. 500 ppt. Finally, cut and cleaned tubes are dried in a nitrogen-purged oven.

B. Software Components

Figure 3:
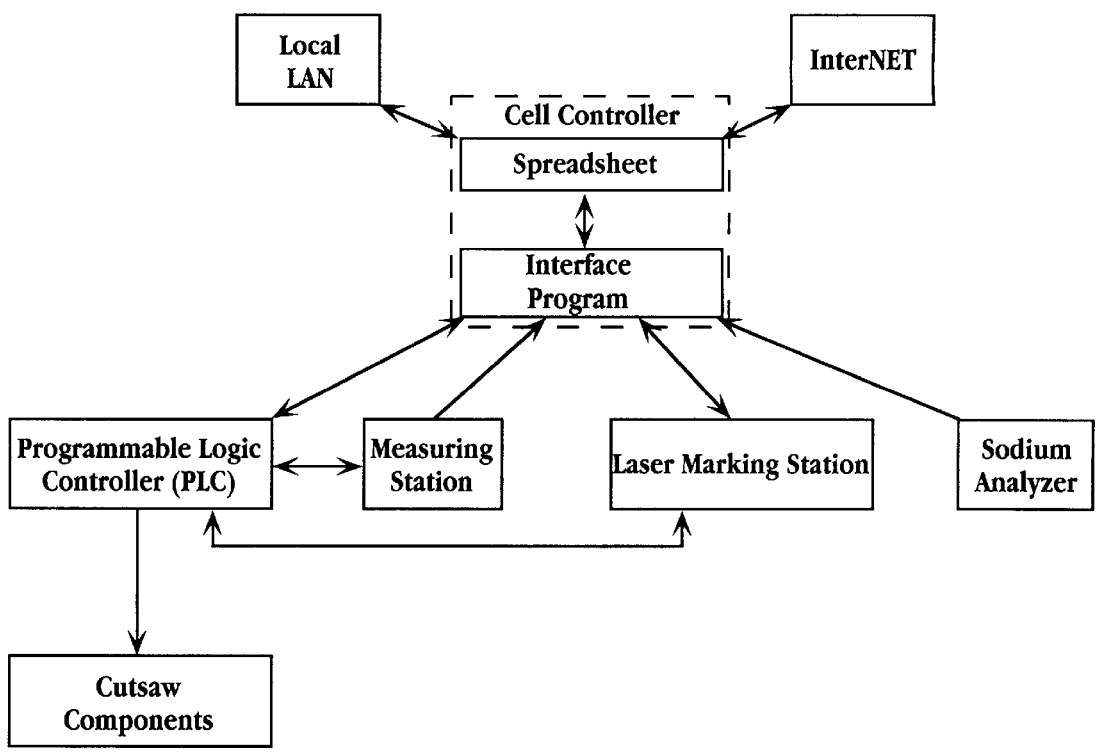
FIG. 3 is a diagram showing the flow of data between components of the apparatus during a cutting, marking and rinsing operation.

FIG. 3 shows the connectivity between the components of the apparatus and the direction of data flow during a typical tube cutting process. The PC cell controller includes a conventional spreadsheet, such as Microsoft Excel™, which contains cutsheet data, and an interface program, such as WINtelligent View™ by Rockwell, which provides communication between the spreadsheet, the laser marking station, and other physical components via the PLC.

Several screens accessible within the View™ interface program provide information to the user regarding an ongoing cutting operation. Some screens, such as the inspection screen, also accept input from the user. The screens include:

(i) a cutsheet screen, which displays the cutsheet within the spreadsheet program;

(ii) a cutsaw screen, showing the tube loading status of the cutsaw, (iii) an active cutsheet screen, which displays a cutsheet indicating cut tubes, uncut tubes and the tube currently being cut;

(iv) a cut tube screen, which displays a cutsheet indicating cut tubes, measured tubes, and the tube currently being measured;

(v) an inspection (measurement) screen, which displays measurement results of the tube currently being inspected and allows operator input for accepting the measurement data, remeasuring, and resetting the measurement tool;

(vi) a "scrapsheet" screen which displays a cutsheet created for recutting of any tubes rejected during measurement;

(vii) an inspected tube screen which displays a spreadsheet showing marked tubes, inspected (but not yet marked) tubes, and the tube or tubes currently being marked;

(viii) a marking view screen which shows a view of the laser marking tray with occupied positions indicated; and (ix) an engraved (marked) tube screen displaying data on tubes which have been marked.

During a cutting operation, the PC cell controller thus performs some or all of the following functions: receiving desired cut length (cutsheet) data from a LAN or other network; inputting cutsheet data to the cutsaw via the PLC; tracking the position of a tube in the sequence of operations (i.e. loading, cutting, measuring, marking, and cleaning); logging the actual cut length of each cut tube from the measuring station; inputting the appropriate marking data to the laser marking station; logging sodium level of a given batch of tubes from the sodium analyzer; calculating the scrap level and process capability (Cp) for a series of tubes; and transferring finished tube and process data (i.e., completed cutsheets) to the LAN or other network.

The data-driven process is thus effective to produce a series of marked, finished-cut tubes, having the physical characteristics described above, and to concurrently produce a recorded output of the tube and process parameters noted above.

While the invention has been described with reference to specific methods and embodiments, it will be appreciated that various modifications may be made without departing from the invention.

It is claimed:

1. An apparatus for producing a plurality of finished-cut, burr-free tube sections, comprising an electrochemical abrasive cutter, said cutter comprising a cutting wheel which defines a cutting plane, a feeder for feeding tubing to the cutting wheel, and an electrolyte stream;

programmable control means for controlling said feeder and cutting wheel;

input means for inputting a series of desired cut lengths to said control means, whereby said feeder is effective to accurately position said tubing with respect to said cutting plane for each said cut length, to produce a corresponding series of cut tubes, each having a serial position and actual cut length;

means for holding said series of cut tubes in serial order for movement to a measuring station;

means within said measuring station for determining the actual cut length of each said tube; and means for holding said series of cut tubes in serial order for movement through a laser marking station.

2. The apparatus of claim 1, wherein said input means comprises a PC cell controller effective to download said cut lengths, stored therein in the form of an electronic spreadsheet or cutsheet, to said programmable control means.

3. The apparatus of claim 2, wherein said cell controller is operably connected to said measuring station, and is effective to track and record the serial position of each cut tube in the series, its desired cut length, and its actual cut length.

4. The apparatus of claim 3, wherein the laser marking station includes a laser, a marking chamber having a plurality of marking positions, and a corresponding plurality of sensor switches effective to determine which positions within the chamber are occupied with tubes.

5. The apparatus of claim 4, wherein said cell controller is operably connected to said sensor switches and said laser, whereby said laser is effective to mark each cut tube occupying a marking position with its serial position and actual cut length.

6. The apparatus of claim 3, further comprising at least one bath for removing electrolyte from a batch of cut tubes, and means for determining the electrolyte concentration of said bath, wherein said cell controller is operably connected to said determining means, and is effective to record said electrolyte concentration for each said batch.

7. The apparatus of claim 1, which further comprises means for purging said tubing with a gas stream during a cutting operation to prevent said electrolyte stream from entering the interior of said tubing.

8. A process for producing a plurality of finished-cut, burr-free tube sections, comprising inputting a series of desired cut lengths to programmable control means operably connected to an electrochemical abrasive cutter, said cutter comprising a feeder, a cutting wheel defining a cutting plane, and an electrolyte stream, controlling said feeder via said programmable control means, whereby said feeder accurately positions said tubing with respect to said cutting plane for each said cut length;

controlling said cutting wheel and electrolyte stream to produce, via electrochemical abrasion, a corresponding series of cut tubes, each having a serial position and actual cut length;

holding said series of cut tubes in serial order for movement to a measuring station;

determining the actual cut length of each cut tube; and holding said series of cut tubes in serial order for movement through a laser marking station.

9. The process of claim 8, wherein said inputting comprises downloading said cut lengths from a PC cell controller to said programmable control means.

10. The process of claim 9, wherein said measuring station is operably connected to said cell controller, and which further comprises tracking and recording said serial position, desired cut length and actual cut length for each cut tube.

11. The process of claim 10, wherein said marking station includes a laser, a marking chamber containing a plurality of marking positions, and a corresponding plurality of sensor switches, and said laser and switches are operably connected to said cell controller.

12. The process of claim 11, further comprising determining from said switches which of said positions are occupied with cut tubes, whereby said cell controller is effective to input to said laser the serial position and actual cut length corresponding to each tube within an occupied position.

13. The process of claim 8, further comprising passing said cut tubes in sequential batches through at least one ultrasonic water bath, and, for each said batch, determining an electrolyte concentration of said bath, and recording said electrolyte concentration.

14. The process of claim 8, further comprising purging said tubing with a gas stream during a cutting operation to prevent said electrolyte stream from entering the interior of said tubing.

* * * * *